United States Patent [19]

Bollyky et al.

[11] Patent Number: 5,040,487

[45] Date of Patent: Aug. 20, 1991

[54] METHOD FOR CONTROLLING ZEBRA MUSSEL (DREISSENA POLYMORPHA)

[75] Inventors: L. Joseph Bollyky, Stamford, Conn.; Wilfred L. LePage, Monroe, Mich.

[73] Assignee: Bollyky Associates, Inc., Norwalk, Conn.

[21] Appl. No.: 518,670

[22] Filed: May 3, 1990

[51] Int. Cl.⁵ ............................................. A01K 61/00
[52] U.S. Cl. ..................................................... 119/4
[58] Field of Search ........................................ 119/3, 4

[56] References Cited

U.S. PATENT DOCUMENTS

| | | | |
|---|---|---|---|
| 3,958,026 | 5/1976 | Leone et al. | 426/332 |
| 4,202,291 | 5/1980 | Kominami et al. | 119/3 |
| 4,440,611 | 4/1984 | Dhar et al. | 204/84 X |
| 4,532,883 | 8/1985 | Lockwood et al. | 119/4 |
| 4,559,902 | 12/1985 | Mason et al. | 119/4 X |

FOREIGN PATENT DOCUMENTS

| | | | |
|---|---|---|---|
| 3294721 | 12/1988 | Japan | 119/3 |
| 1157328 | 6/1989 | Japan | 119/3 |
| 1009358 | 4/1983 | U.S.S.R. | 119/3 |

Primary Examiner—John J. Wilson
Assistant Examiner—R. Thomas Price
Attorney, Agent, or Firm—Norton S. Johnson

[57] ABSTRACT

The present invention relates to a method of control of the Zebra Mussel from infestation of:

(a) waterworks by applying an effective amount of ozone to a fresh (raw) water system of the waterworks, (b) cooling system of power plants and industrial plants by applying an effective amount of ozone to the intake water of the system, and (c) industrial process water systems by supplying an effective amount of ozone to the intake water of the system.

7 Claims, 1 Drawing Sheet

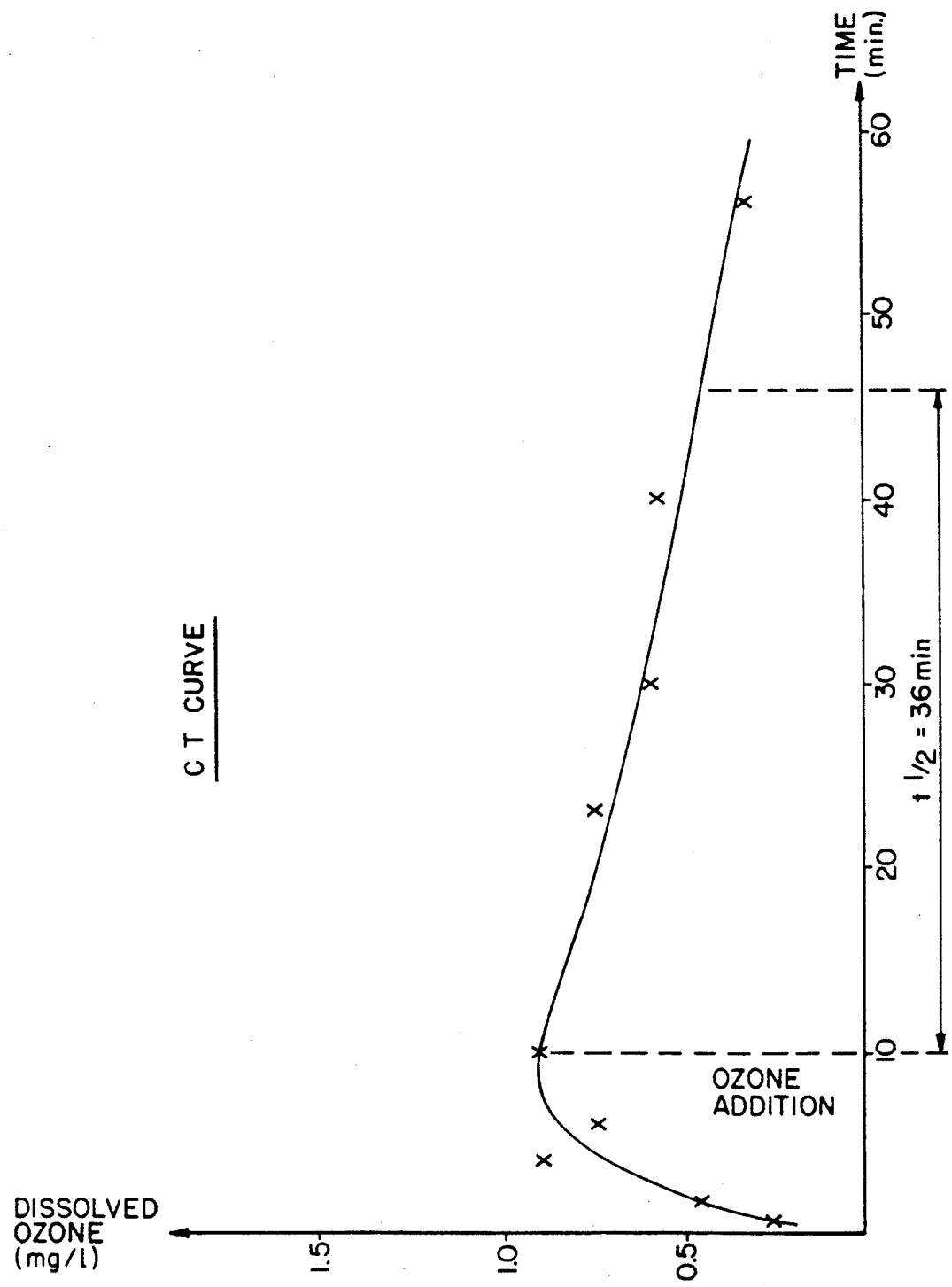

METHOD FOR CONTROLLING ZEBRA MUSSEL (DREISSENA POLYMORPHA)

FIELD OF THE INVENTION

The present invention relates to a method of controlling the Zebra Mussel (Dreissena Polymorpha), a fresh water mussel, from infestation of waterworks, the raw water intake and intake pipe of water treatment plants, power plants, chemical plants, refineries and other industrial installations and their cooling water intake, intake pipe and cooling system and more particularly is concerned with a method for preventing adherence of such mussels by infestation of pipes, cooling systems, heat exchangers, condensers and other surfaces flooded by cooling or process water and other articles in fresh water lakes.

BACKGROUND OF THE INVENTION

Growths of sessile organisms such as mussels are of frequent occurrence on the walls of water pipes. Their presence is unwelcome mainly for two reasons: first because by reducing the effective bore of the pipe and increasing the roughness factor, they diminish the water carrying capacity of the system, and second, through setting up local differences in the state of oxidation on the inner surface they can be responsible for electro-corrosion of steel and cast-iron pipes. These consequences are responsible for much waste in the water supply industry in increased pumping costs, loss of water carrying and treatment capacity, in pipe cleaning, maintenance and replacement. Similarly, in the electrical power generation, the chemical, refinery and other industries they are responsible for diminished cooling capacity, lower production capacity and the more frequent cleaning maintenance and replacement.

The Zebra Mussel is dark brown or black in color, and often has a very pretty arrangement of brown and fawn stripes, hence its name of Zebra Mussel. It attaches itself to firm objects such as water pipes by up to 200 tough fibers of a dark horny material (the byssus) and usually leads a sessile existence. Frequently the mussels fix these lyssel threads to other mussels, thus forming clusters in open water, and layers of up to a foot or more on walls and pipes.

The earliest published reference to Dreissena polymorpha dates to the mid-eighteenth century when their presence in the northern Caspian Sea and the Ural River was described by Pallas. The mussel has since spread relentlessly throughout central and southern Europe and is making inroads in the southern portions of Scandinavia and eastward into Asia.

Dreissena polymorpha was unknown in the Laurentian Great Lakes prior to 1988 when substantial infestations were discovered in southeastern Lake St. Clair. Presumably, the mussels were introduced with ballast water discharged from the tanks of international shipping about two years earlier. They have spread throughout Lake Erie with phenomenal speed and reports of their presence at Green Bay, Wis. and Gary, Ind. on Lake Michigan imply that it is only a matter of time before all the Great Lakes and the adjacent Mississippi and Ohio River Basins are affected. With time, the threat may extend to every body of surface water in North America.

The explosive development of the mussel population in western Lake Erie has prompted dire predictions for the future. The number of animals per unit area promises to increase exponentially, especially during the years immediately following the initial infestation.

Various methods have been proposed for the removal of existing growth of the Zebra Mussel such as by scraping the mussels from mains and tanks. This method is not only slow and expensive but the greatest drawback is that it cannot be expected to remove every mussel from the pipe mains and cooling or heat exchange equipment. Moreover, it means that the pipe mains and other equipment cannot be in service during the treatment intended to remove the Zebra Mussel.

Chlorine has been proposed for the removal of the mussels and dosing of the water with up to 50 ppm chlorine as it flows through the main for periods upwards of two weeks has been shown to be a reliable method of control.

However, the use of chlorine for such purposes has certain obvious disadvantages since it is quite toxic to humans and animals and is corrosive to the operating equipment. It produces undesirable often toxic, even carcinogenic, chlorinated organic compounds in the water.

It would be highly desirable, therefore, if an improved process could be developed for controlling the infestation of the Zebra Mussel without the use of laborious time-consuming scraping or pigging operations or the use of materials which are toxic to humans and animals and are corrosive to the operating equipment.

It would also be highly desirable if an improved process could be developed that would permit the use of a non-toxic material that would effectively remove the Zebra Mussel from water pipes and other waterworks with a minimum of difficulty, time and expense.

It is, therefore, an object of the present invention to provide an improved process for controlling Zebra Mussel infestations with the use of a material which is non-toxic to humans and animals.

It is a further object of this invention to provide a novel process for removing infestations of the Zebra Mussel in water pipes and waterworks in the water cooled equipment, heat exchangers, condensers and piping of power plants, chemical plants and other industrial equipment that is efficient and relatively inexpensive and does not involve disruption of the water system to the consuming public.

These and other objects of the present invention are readily achieved by the process hereinafter described.

BRIEF SUMMARY OF THE INVENTION

The objects of the present invention are readily achieved by the discovery that it is possible to control the infestations of the Zebra Mussel in water pipes, cooling systems and the like by the use of ozone. This chemical is non-toxic to humans and animals, in the concentration contemplated herein, unlike chlorine, and is non-corrosive to pipes and other materials commonly used in waterworks or power plants and other plants. The ozone treatment is not expected to produce toxic byproducts. Ozonation thus provides a fast and efficient manner of controlling the infestation of water pipes by the Zebra Mussel as well as preventing the adherence of such mussels to pipes and other objects commonly found in waterworks for fresh water lakes.

BRIEF DESCRIPTION OF THE DRAWINGS

FIG. 1 shows the half-life of dissolved ozone.

DETAILED DESCRIPTION OF THE INVENTION

Ozone must be introduced into the water entering the system as near the crib of the water intake as possible to kill the larvae, the motile larvae, (veligers and post-veligers) and thereby prevent them from establishing residence and developing inside the pipe and the cooling system of power and other plants.

An ozone treatment system has been developed. The overall objective of the ozonation system is to protect the new or the mechanically cleaned old raw water, cooling or process water intake line from the crib to the pump station with the application of ozone. The ozone treatment is applied at the inlet to the pipe line and possibly at one or more additional points along the length of the pipeline. If the line is very long or the control of Zebra Mussel is critically important, it might be necessary to protect the transmission main from the pump station to the treatment plant with a second application of ozone. While the application of ozone is designed to produce a barrier to survival of the animals, it will also produce several side benefits that must be factored into the overall water treatment process. These include taste and odor control and disinfection or just a preozonation treatment prior to chemical coagulation, settling or filtration to be carried out later in the plant. Perhaps the key, most important benefit expected as a result of ozonation for mussel control, is that it should preclude the excessive formation of trihalomethanes and other toxic or undesirable disinfection byproducts normally associated with chlorination. The disinfection requirements of the surface water treatment rules established in 1989 by the U.S. Environmental Protection Agency can be readily attainable in most cases without negative impact on current and proposed regulation of disinfection byproducts.

The present invention may be most efficiently carried out in one of two ways:
(a) direct ozonation of the fresh lake water at the intake of the raw water line extending a few thousand feet offshore as the first ozone treatment step. This can be readily accomplished by ozone gas being piped from ozone generators on or off-shore to an ozone contactor offshore, and
(b) the second way in which the desired ozonation can be accomplished involves side stream ozonation where a high concentration of ozone dissolved in water is piped to the inlet of the intake pipe in the lake and blended with water entering the pipe as the first ozonation step. This method would require no offshore ozone contactor structure or offshore ozone generator system. The side stream ozonation process might utilize a treated, filtered, water stream with a low ozone demand and low ozone decomposition rate for the preparation of the side stream that contains the high dissolved ozone concentration. Alternatively, the raw water to be treated for Zebra Mussel control can be utilized for the preparation of the side stream if the water quality parameters permit. The side stream ozonation process would use land based ozone generators. On the other hand, both alternatives would require a conventional land based ozonation system for the second ozone treatment step intended to provide a second barrier for protection of the pipe line from the pump station to the treatment plant, power plant or other plant.

At present, it appears that the side stream ozonation procedure is preferred especially under moderate or cold climate conditions as the dissolved ozone residuals that successfully prevent mussel survival at the treatment plant are easily attainable for application at the intake of the submerged raw water or cooling water pipe line.

The present invention has several advantages over the presently known systems of controlling the infestation of raw water intake pipe line of waterworks and the intake pipe line of cooling water for power plants by the Zebra Mussel such as by the application of chlorine.

Thus, the present invention controls the eggs, larvae, veligers and post-veligers of the mussel by killing or disabling them so that they can not colonize in the water lines or other exposed surfaces under water.

The ozone treatment of the present invention does not add environmentally undesirable chemicals to the water or to the drinking water. The ozone treatment is effective in low concentrations, e.g. $\leq 0.3$ mg/l. The ozone treatment can be readily incorporated into the drinking water treatment process or into the cooling water loop of power plants or other plants or process water treatment of most plants.

The low dissolved ozone concentration in the water is most effective against the eggs, larvae, the veligers (a few hour-old fertilized larvae) and post-veligers. The ozone treatment can be expected to kill the mussels before they can attach themselves to the surface or interior of the raw water pipes. The ozone treatment, therefore, prevents the colonization of the interior of the pipe by the Zebra Mussel thereby eliminating the danger of decreased water flow through the pipe.

Essential for the successful operation of the system is the determination of the ozone dosage required to achieve a certain dissolved ozone concentration in the water in which the Zebra Mussel is to be controlled. This concentration should be the same or higher than the Lethal Dissolved Ozone Concentration. Typical ozone dosage requirements are shown for Lake Erie water in the Table 1 below. The ozone dosage required is dependent on the ozone demand and on the decomposition rate of the ozone in the water under treatment. The ozone decomposition rate can be determined from the CT curve (concentration versus time plot). A good indicator of the decomposition rate is the ozone half life which is the time required for the ozone to decompose to 50% of its initial concentration.

TABLE 1

| THE OZONE DOSAGES REQUIRED FOR VARIOUS DISSOLVED OZONE CONCENTRATIONS IN LAKE ERIE WATER | | |
|---|---|---|
| Temperature °C. | Ozone Required mg/L | Dissolved Ozone mg/L |
| 18 | 1.5 | 0.26 |
| 18 | 3.3 | 0.47 |
| 18 | 5.2 | 0.90 |

The ozone dosages necessary to obtain certain dissolved ozone concentrations in the Lake Erie water were determined at 18° C. The results indicate (Table 1) that ozone dosages of 1.5 mg/L and 3.3 mg/L are necessary to obtain dissolved ozone concentrations of 0.26 mg/L and 0.47 mg/l, respectively. The half life of the dissolved ozone was found to be 36 minutes under these conditions (FIG. 1).

The lethal dissolved ozone concentration (LDOC) is another essential treatment parameter for control of Zebra Mussel. This is the ozone concentration in mg/l necessary in the water to kill the larvae, veligers and post veligers of the Zebra Mussel. It is dependent on the treatment or exposure time measured, in minutes. In a 4000 ft. long typical raw water intake pipe line, the typical exposure time is 16 minutes. Depending on the decomposition rate or half life of ozone in the water under treatment, the ozone might have to be added at more than one point along the pipe line to maintain the necessary Lethal Dissolved Ozone Concentration.

The Lethal Dissolved Ozone Concentration has to be determined experimentally in a bioassay. The best available information at this time indicates that a LDOC $\leq 0.30 - 3.00$ mg/l or less. It is based on measurements in a full scale plant.

The required ozone dosage to obtain the lethal dissolved ozone concentration is determined by adding the ozone containing gas into the water to be treated for Zebra Mussel control by means of a 4 liter diffusion type ozone contactor. The water in the ozone contactor is being recirculated with an external pump to provide counter current flow at the rate of 6 liter/min. and the water in the ozone contactor is being stirred with a magnetic stirrer. The ozone concentration, temperature, pressure and flow of the inlet gas to the ozone contactor and the outlet gas from the ozone contactor are monitored as the function of treatment time. The cumulative difference between the ozone in the inlet gas and in the outlet gas is the ozone dosage at any point during the treatment time. The dissolved ozone concentration in the water is monitored as the function of treatment time by taking small 60 ml samples for ozone analysis using the indigo method. The data accumulated that way are plotted on an ozone concentration versus treatment time plot as shown in FIG. 1. From that plot the ozone dosage required and the ozone decomposition rate and ozone half life can be determined.

As indicated earlier, the ozone treatment of water to prevent Zebra Mussel infestation can be accomplished either by direct treatment of the water with ozone gas or by side stream ozonation. In the case of side stream ozonation, the ozone is dissolved in the water first then the water high in dissolved ozone concentration is transported to or pumped to and mixed into the water to be treated.

For producing the side stream which carries the high concentration of dissolved ozone, a clean pretreated filtered water might be used. This water might be the tap water produced by a water treatment plant. In such clean water where the ozone demand and the ozone decomposition rate are very low a higher dissolved ozone concentration can be obtained using a smaller ozone dosage. For example, in distilled water at 18° C., pH=7 and ozone demand=0 the achievable dissolved ozone concentrations are shown in Table 2 below.

TABLE 2

| SOLUBILITY OF OZONE IN WATER (18° C., 1 ATM) | | |
|---|---|---|
| Ozone | | Solubility |
| % (wt.) | generated form | mg/l |
| 1 | air | 4.75 |
| 2 | air | 9.50 |
| 3 | oxygen | 15.66 |
| 5 | oxygen | 26.07 |

A particularly useful application of ozone treatment for Zebra Mussel control is the control of mussel infestation in the intake raw water pipe of a drinking water treatment plant.

The raw water intake pipe usually extends to several thousand feet into a lake or reservoir at 20–50 ft. below the water surface in order to obtain the clearest water for the plant and to avoid interference with boating and other water surface activities.

The direct ozonation of the water at the intake of the raw water pipe requires the construction of an ozone contactor, or ozone dissolution facility in the lake even when the ozone generator is located on shore.

The side stream ozonation allows the location of the ozone generating as well as the ozone dissolution facility on shore. We have found experimentally (See FIG. 1 attached) that the raw water consumes a lot of ozone and the use of a pretreated clean fresh water is preferred for side stream ozonation. That is, the ozone should be dissolved in fresh tap water that has a low ozone demand. Then the tap water with high ozone concentration dissolved in it can be pumped out into the lake into the intake of the intake pipe line.

The use of clean fresh tap water permits:
(a) higher dissolved ozone concentration,
(b) requires smaller ozone generating capacity due to the lower ozone demand and decomposition in this water, and
(c) small amount of side stream water flow and smaller pipe and pump to transport it.

An important side benefit is that simultaneously with the Zebra Mussel control the ozone treatment carries out its oxidizing, microflocculating and disinfecting effect on the treated water. Therefore, this treatment can be incorporated into the overall water treatment process of the water treatment plant.

Another particularly useful application of ozone treatment for Zebra Mussel Control is the control of mussel infestation in the cooling water intake, cooling system including the heat exchangers, condensers, pumps of the electrical power generating plants.

What is claimed is:

1. A method for controlling the infestation of the Zebra Mussel in a fresh water system which comprises adding thereto an effective amount less than or equal to 0.3 mg/l of ozone to control the infestation of said system by said mussel.

2. The method according to claim 1 in which the water system is a fresh water, drinking water treatment system.

3. The method according to claim 1 in which the water system is a cooling water system to power generating plants, chemical plants or other industrial plants.

4. A method for preventing adherence of the Zebra Mussel to fresh water intake pipes and other articles in the water which comprises adding to the water an effective amount less than or equal to 0.3 mg/l of ozone to prevent adherence of said mussel to said pipes and articles in the water.

5. The method according to claim 4 in which the ozone gas is added directly to the water.

6. The method according to claim 4 in which the application of the ozone is by side stream ozonation wherein a high concentration of ozone dissolved in water mixed into the water to be treated.

7. The method according to claim 1 in which the dissolved ozone concentration is 3 mg/l or less.

* * * * *